(12) United States Patent
Rayrole et al.

(10) Patent No.: US 8,570,965 B2
(45) Date of Patent: Oct. 29, 2013

(54) SYSTEM AND METHOD FOR CONTROLLING COMMUNICATIONS IN AN AD HOC MOBILE NETWORK

(75) Inventors: Martin Rayrole, Chatillon (FR); Antoine Soulie, Paris (FR)

(73) Assignee: Thales, Neuilly sur Seine (FR)

( * ) Notice: Subject to any disclaimer, the term of this patent is extended or adjusted under 35 U.S.C. 154(b) by 403 days.

(21) Appl. No.: 12/978,489

(22) Filed: Dec. 24, 2010

(65) Prior Publication Data

US 2012/0002615 A1 Jan. 5, 2012

(30) Foreign Application Priority Data

Dec. 30, 2009 (FR) .................................. 09 06393

(51) Int. Cl.
*G01R 31/08* (2006.01)
*H04H 20/71* (2008.01)
*H04W 4/00* (2009.01)
*H04B 7/212* (2006.01)

(52) U.S. Cl.
USPC ............ 370/329; 370/241; 370/312; 370/444

(58) Field of Classification Search
None
See application file for complete search history.

(56) References Cited

U.S. PATENT DOCUMENTS

| | | | |
|---|---|---|---|
| 2006/0009248 A1* | 1/2006 | Sakamoto et al. | 455/517 |
| 2007/0049314 A1* | 3/2007 | Balachandran et al. | 455/518 |
| 2010/0329463 A1* | 12/2010 | Ratliff et al. | 380/279 |

FOREIGN PATENT DOCUMENTS

| | | |
|---|---|---|
| WO | 0052950 A1 | 9/2000 |
| WO | 0156323 A1 | 8/2001 |

OTHER PUBLICATIONS

XP-001546011, "Scalable and QoS-Aware Dynamic Slot Assignment and Piconet Partitioning to Enhance the Performance of Bluetooth Ad Hoc Networks," by Carlos Cordeiro et al, IEEE Transactions on Mobile Computing, vol. 5, No. 10, pp. 1313-1330, Oct. 1, 2006.
XP-019028431, "Comparative Analysis of Ad-Hoc Networks Oriented to Collaborative Activities," by Sebastián Echeverria et al., Architecture of Computing Systems—ARCS 2006 Lecture Notes in Computer Science, pp. 465-479, Jan. 1, 2006.
XP010270400, "Controlled Multimedia Wireless Link Sharing via Enhanced Class-Based Queuing with Channel-State-Dependent Packet Scheduling," by Christine Fragouli et al., Infocom'98—Seventeenth Annual Joint Conference of the IEEE Computer and Communications Societies. Proceedings IEEE San Francisco, CA, vol. 2, pp. 572-580, Mar. 29, 1998.

* cited by examiner

*Primary Examiner* — Kwang B Yao
*Assistant Examiner* — Jutai Kao
(74) *Attorney, Agent, or Firm* — Baker & Hostetler LLP

(57) ABSTRACT

A method for controlling communications within an ad hoc mobile network includes a plurality of terminals having the slave function and/or the master function, said slave terminals also including a slave orchestration system, said master terminals also including a master orchestration system. The slave orchestration system includes at least one network test module, a module for controlling communications, and a database of communications to be set up and an administration module. The master orchestration system includes at least one network test module, a module for controlling communications, a database of communication requirements, a decision engine, a database of current communications, a rule database for prioritizing communications, and an administration module. The master orchestration system is suitable for defining which communications between the slave terminals are authorized according to said prioritization rules and for notifying the slave orchestration systems of the slave terminals of their authorization to set up a communication or of the need to interrupt a communication previously set up.

2 Claims, 2 Drawing Sheets

SYSTEM AND METHOD FOR CONTROLLING COMMUNICATIONS IN AN AD HOC MOBILE NETWORK

CROSS-REFERENCE TO RELATED APPLICATION

This application claims priority to foreign French patent application No. FR 0906393, filed on Dec. 30, 2009, the disclosure of which is incorporated by reference in its entirety.

FIELD OF THE INVENTION

The present invention relates to a system and a method for controlling communications within an ad hoc mobile network. It applies notably during the deployment phase of a new network, when all the terminals part of this network are situated in the same geographical area. The invention applies advantageously to networks operating with UHF (ultra high frequency) radiofrequency bands or even higher frequency bands.

BACKGROUND

The ad hoc mobile networks are networks with no infrastructure in which the information items are exchanged directly between the nodes of the network which combine the functions of sender, receiver and information relay.

When a large number of terminals are within radio range of one another, the communications may be impossible because of radio interferences generated by a large number of users and also because of the unpredictable convergence time of the radio vicinity discovery algorithms.

The known ad hoc mobile networks often operate at low bit rates which means a limited number of users, so the issue of reducing the convergence time of the radio vicinity discovery algorithms is therefore less present.

SUMMARY OF THE INVENTION

The aim of the present invention is notably the control of communications within the network in order to limit the number of terminals likely to send in one and the same coverage area defined by the radio range of the system.

To this end, one subject of the invention is a system for controlling communications within an ad hoc mobile network comprising a plurality of terminals, characterized in that:
each of said terminals comprises at least one radio antenna, an ad hoc mobile communication system suitable for sending and receiving data, a network description database which contains at least the address of all the terminals of the network and the list of the communities of interest which group all the terminals likely to have to communicate with one another, said terminals additionally including a slave orchestration system;
at least one of said terminals also has the master function, said master terminals also including a master orchestration system;
said slave orchestration system comprising at least one network test module, a module for controlling communications, a database of communications to be set up and an administration module;
said master orchestration system comprising at least one network test module, a module for controlling communications, a database of communication requirements, a decision engine, a database of current communications, a rule base for prioritizing communications and an administration module; and
said master orchestration system being suitable for defining which communications between the slave terminals are authorized according to said prioritization rules and for notifying the slave orchestration systems of the slave terminals of their authorization to set up a communication or of the need to interrupt a communication previously set up, said prioritization rules being established according to at least one of the following criteria: criticality of the communication, maximum duration $D_{max}$ of the communication, maximum number of terminals that can send simultaneously, available bandwidth.

In a variant embodiment of the invention, the network test module is suitable for executing, at a given instant, a test step consisting at least in:
breaking down said community of interest into a number of test groups that is at least equal to one, each of said test groups comprising at most a number of terminals equal to the maximum number of terminals authorized to communicate simultaneously, the intersection between all the test groups being not empty;
sending from the master terminal to all the slave terminals of said test group a test request message containing a sample of the service to be tested and a time delay value $T_{temp}$;
sending from each slave terminal, upon receipt of said test request message, said test sample to all the terminals of the community of interest;
sending from each slave terminal of said test group, upon receipt of a test sample, an acknowledgement message to the slave terminal sending said test sample; and
sending from each slave terminal of said test group to the master terminal, before the expiry of the time delay $T_{temp}$, a test report containing the list of the terminals receiving the test sample for which no acknowledgement has been received.

Another subject of the invention is a method for controlling communications within an ad hoc mobile network comprising a plurality of terminals having the slave function, said terminals also comprising a slave orchestration system, at least one of said terminals also having the master function, said master terminal also including a master orchestration system, said method being characterized in that it comprises at least:
a step for determining which communications between the slave terminals are authorized according to prioritization rules established according to at least one of the following criteria: criticality of the communication, maximum duration $D_{max}$ of the communication, maximum number of terminals that can send simultaneously, available bandwidth; and
a step for notifying the slave orchestration systems of the slave terminals of their authorization to set up a communication or of the need to interrupt a communication previously set up.

In a variant embodiment, the method according to the invention also includes a step for testing, at a given instant, communications for all the communities of interest which group all the terminals likely to have to communicate with one another, said test step consisting at least in:
breaking down said community of interest into a number of test groups that is at least equal to one, each of said test groups comprising at most a number of terminals equal to the maximum number of terminals authorized to communicate simultaneously, the intersection between all the test groups being not empty;

sending from the master terminal to all the slave terminals of said test group a test request message containing a sample of the service to be tested and a time delay value $T_{temp}$;

sending from each slave terminal, upon receipt of said test request message, said test sample to all the terminals of the community of interest;

sending from each slave terminal of said test group, upon receipt of a test sample, an acknowledgement message to the slave terminal sending said test sample; and sending from each slave terminal of said test group to the master terminal, before the expiry of the time delay $T_{temp}$, a test report containing the list of the terminals receiving the test sample for which no acknowledgement has been received.

BRIEF DESCRIPTION OF THE DRAWINGS

Other features will become apparent upon reading the following detailed description given as a nonlimiting example, in light of the appended drawings which represent.

DETAILED DESCRIPTION

The invention relates to ad hoc mobile networks, notably those operating in a UHF (ultra high frequency) radiofrequency band. In such a network, it is commonplace for a large number of terminals to be situated one radio hop from one another. The expression "radio hop" should be understood to mean the maximum area of geographical coverage allowing direct communication by radio link between two terminals. The dimension of such an area is defined by the range of the radio link used. In particular, when deploying a new ad hoc network, a large number of terminals are grouped in a reduced geographical area. When the network is established, such a configuration may also appear when a large number of terminals are grouped in a limited area. In such circumstances, the convergence time of the radio vicinity discovery algorithms become uncontrollable. In practice, the protocols of the state of the art used in the ad hoc networks have a theoretical convergence time which increases greatly when the number of terminals increases, and the radio interferences created by a large number of terminals may make this convergence time infinite.

The invention proposes a method for controlling, or orchestrating, communications in the event of close proximity of a large number of terminals within an ad hoc mobile network. One aim of the invention is to remain compatible with the usual ad hoc mobile network mechanisms while limiting the number of terminals that can send at a given instant. This limitation makes it possible to control the number of sending terminals and therefore limit the convergence time of the radio vicinity discovery algorithms. The invention also makes it possible to reduce the radio interferences which disrupt the operation of these algorithms.

To this end, the method according to the invention comprises at least the following steps:

a step for entering into "close proximity" communication mode, which can be done at the time the network is established, or when the network is already operating;

a network test step which makes it possible to know the state of operation of the network;

a step for direct communication between terminals which allows for the use of the network when the terminals are grouped in a reduced geographical area; and a step for exiting from the "close proximity" communication mode which is activated when a large number of terminals, hitherto present in one and the same radio hop, disperse over an extended geographical area.

To implement the method according to the invention, each terminal of the ad hoc mobile network is equipped with an orchestration system which implements the communication control method and notably establishes the close proximity communication mode. The expression "close proximity" is used to designate a scenario for which a very large number of terminals are all situated in one and the same radio hop.

Figure 1:
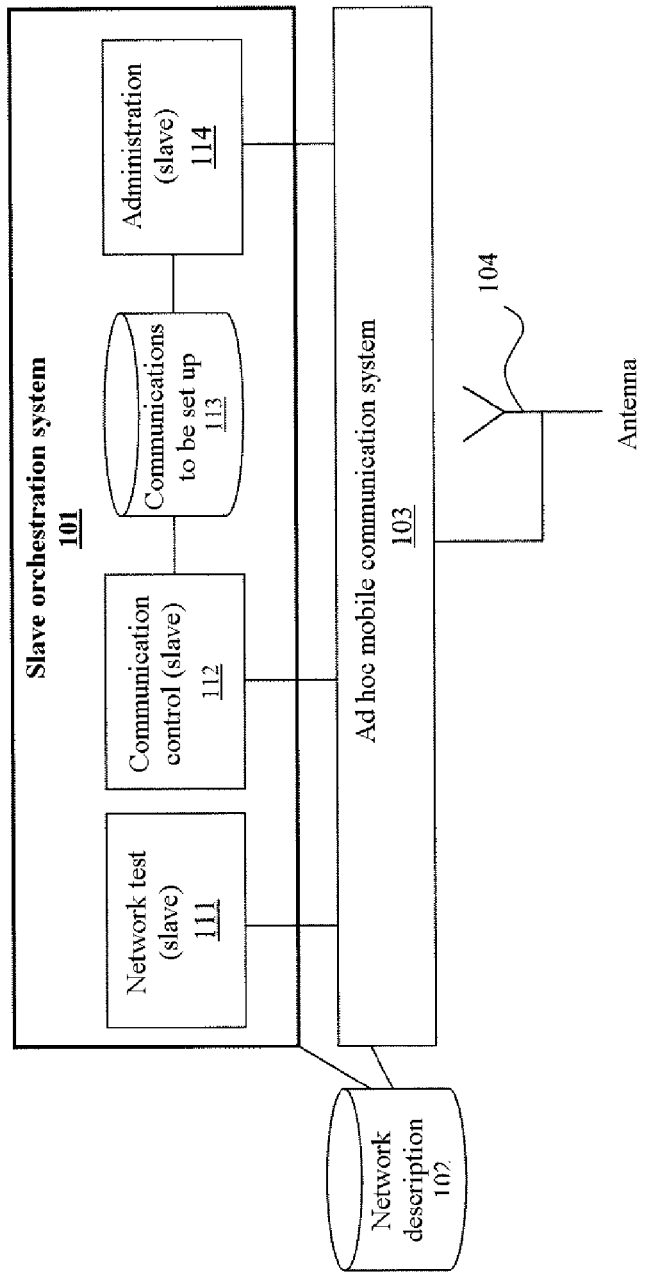
FIG. 1, a block diagram of the architecture of a slave terminal implementing the method according to the invention.
Figure 2:
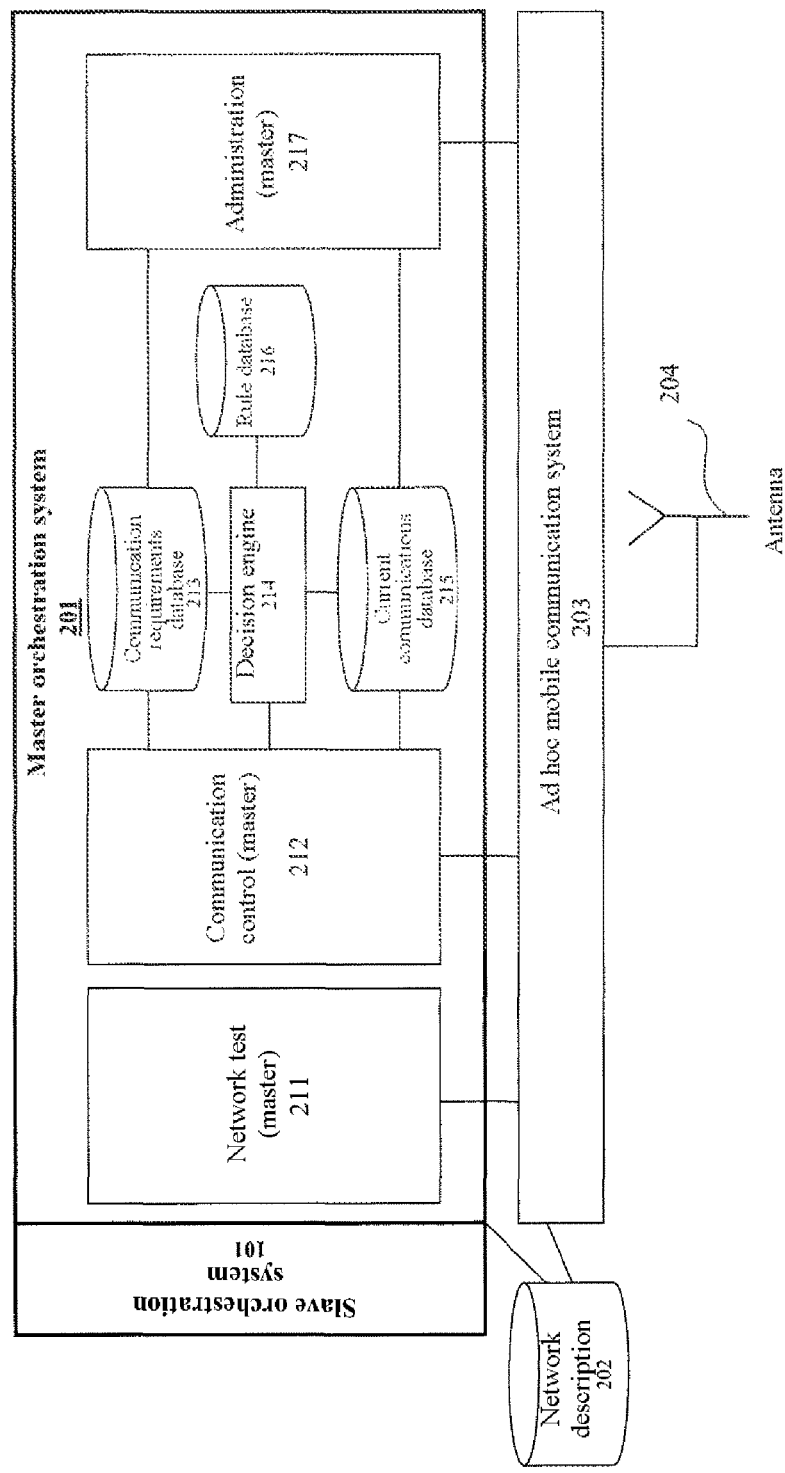
FIG. 2, a block diagram of the architecture of a master terminal implementing the method according to the invention.

For this, two types of terminals are defined, as diagrammatically represented based on FIGS. 1 and 2.

FIG. 1 diagrammatically represents the architecture of a slave terminal 100 equipped with a slave orchestration system. This terminal 100 comprises at least one radio antenna 104, an ad hoc mobile communication system 103, a database 102 containing the description of the network and a slave orchestration system 101.

The ad hoc mobile communication system 103 offers, in addition to the basic mechanisms of an ad hoc mobile system, such as a routing or signalling protocol, a radio silence mode. When this mode is activated, the corresponding terminal operates only as a radio receiver. When this mode is deactivated, the corresponding terminal operates both as radio sender and receiver.

The database 102 contains the description of the network, in particular the address of all the terminals of the network and the list of the communities of interest with the terminals that form them. A community of interest or "COI" is a grouping of terminals likely to have to communicate with one another for a predefined purpose. For example, a community of interest may group terminals that want to regularly set up conference calls; another community of interest may group a set of terminals, coupled to cameras that want to share their video sequences.

The slave orchestration system 101 comprises at least the following elements. A network test module 111 receives tests requests, via the ad hoc mobile network, and executes them in order to test the state of operation of the network. A database 113 contains the communications that the terminal 100 wants to set up at a given instant. For each of these communications, the database contains a unique identifier for each terminal, the list of the recipient terminals or the recipient community of interest, the type of link, which may be unidirectional or bidirectional, the minimum bandwidth needed, the service (for example telephony, messaging, alarm system, etc.), and the criticality of the communication. For example, a high criticality is defined for a serious alert message, and a low criticality for a message whose content is deemed less important. A communication control module 112 sends, on request, the list of the communications that the terminal 100 wants to set up at a given instant, and sets up or deletes the communications according to authorizations that it receives from the master terminal 200. An administration module 114 enables the terminal 100 to enter into or exit from the close proximity communication mode.

FIG. 2 diagrammatically represents the architecture of a master terminal 200 equipped with a master orchestration system. This terminal 200 comprises at least all the components of a slave terminal 100, because it executes both master and slave functions. This terminal 200 therefore comprises a slave orchestration system 101, a network description database 202, an ad hoc mobile communication system 203 and a radio antenna 204. Furthermore, it also includes a master orchestration system 201 which comprises the following elements.

A network test module 211 sends test requests to a plurality of slave terminals, via the ad hoc mobile network.

A communication control module 212 collects the communication requirements within the network, and transmits to the slave terminals the list of the communications that they are authorized to be set up.

A database 213 contains all the communication requirements over all the network. Its contents correspond to the aggregation of the databases 113 of the communications to be set up for all the slave terminals. For each communication to be set up, the requesting terminal is also stored as is the time at which the communication was initially requested by the slave terminal 100.

A database 215 contains the list of all the communications currently in progress in the network. For each of these communications, the database 215 contains the same parameters as those of the database 213 of the communication requirements, and the setup time for each communication.

A rule database 216 expressed in the form of predicates. These rules make it possible to choose, from the communication requirements, which communications can be set up, and which communications already set up must be interrupted. The rule database 216 receives as input all the data contained in the databases 213 containing all the communication requirements and 215 containing the list of the current communications in the network, and the maximum number of terminals that can send simultaneously in one and the same radio hop. Based on these data, the rules make it possible to assign an order of priority between the communications to be set up or those already set up. This order of priority is then used to authorize or refuse each of the communications to be set up or already set up. Finally, by comparing this "authorized/refused" marking and the list of communications already set up, the rules determine the list of the new communications to be set up, and the list of the communications already set up that must be interrupted.

As an example, the rule database 216 contains the following rules.

If a communication for the telephony service is of medium priority and it has been set up for a predetermined duration, then this communication must switch to a low priority.

If a communication is of high criticality, then its priority is high.

If each sending terminal of a communication to be set up is also the sender of one or more communications already set up, then the priority of the communication to be set up is increased by one level.

If a communication "A" that is not set up and without marking, that is to say neither authorized nor refused, is of higher priority than a communication "B" already set up, then the communication "A" must be marked as authorized.

If two communications have the same priority level, then the one requiring the least bandwidth is the higher priority.

If the number of sending terminals for the communications already set up and the authorized communications is greater than the maximum number of terminals that can simultaneously send in one and the same radio hop, then the communication of lowest priority among these communications must be marked as refused.

If a communication already activated is marked as refused, then this communication must be interrupted.

A decision engine 214 receives as input data the databases of the communication requirements 213 and of the current communications 215, and the rule database 216. As output, the decision engine 214 supplies the communication control module 212 with the list of the current communications to be interrupted and the list of communication to be set up.

Finally, an administration module 217 makes it possible to enter into and exit from the close proximity communication mode.

The following paragraphs detail the implementation of each step of the method according to the invention by the "master" terminals 200 and "slave" terminals 100.

Initialization

The following operations are carried out during an initialization phase of the master and slave orchestration systems.

The description of the network is broadcast to all the terminals. This broadcast can be performed, for example, by using a physical memory media inserted into each terminal 100, 200. A configuration parameter, present in each terminal 100, 200, indicates if this terminal is only "slave" or if it is also "master". This parameter has the "slave" value by default. This value is modified, via the user interface of the terminal, to the "master" value for one, and only one, randomly chosen terminal of the network.

On the "master" terminal 200, another configuration parameter indicates the maximum number of terminals likely to send, in one and the same radio hop, at a given instant. This parameter is named $N_{max}$ hereinafter in the document. Its value is defined according to the constraints of the system and the bearer waveform of the network.

For each service supported by the communication system (for example, telephony, messaging, file sharing, etc.), a test sample is stored on the master terminal 200 on installation of the service. For example, a few seconds of speech for the telephony service, a text for the messaging service, etc. This sample of the data to be transmitted is used by the network test module 111, 211 according to the procedure described hereinbelow, in order to determine the state of operation of each service.

Entry into "Close Proximity" Communication Mode

The entry into "close proximity" communication mode is notably performed on starting up the network. The master terminal 200 starts with the "close proximity" communication mode activated and the "radio silence mode" deactivated. All the other terminals start with the "close proximity" communication mode activated and the "radio silence" mode activated.

The entry into "close proximity" communication mode can also be performed when the network is already operational. This occurs, for example, when a large number of terminals, hitherto distributed over an extended geographical area, are grouped in a restricted geographical area equivalent to one and the same radio hop. In this case, the entry into "close proximity" communication mode is performed by the administration module 114, 217.

On the master terminal 200, the following procedure is launched by a command to enter into "close proximity" communication mode. This command is, for example, invoked from the user interface of the master terminal 200.

The databases of the communication requirements 213 and of the current communications 215 are purged, that is to say that their content is erased.

The network test 211 and communication control 212 modules of the terminal are activated.

The radio silence mode of the ad hoc mobile communication system 203 of the master terminal 200 is deactivated.

The administration module 217 of the master terminal 200 broadcasts to all the terminals of the network a notification of entry into "close proximity" communication mode.

On each slave terminal 100, the following procedure is executed on receipt of a notification of entry into "close proximity" communication mode.

The database of communications to be set up 113 is purged.

The network test 111 and communication control 114 modules of the terminal are activated.

If the terminal 100 is not also the master terminal, the radio silence mode of the ad hoc mobile communication system 103 of the master terminal 200 is activated.

Network Test

The network test module 111, 211 makes it possible to know the state of operation of the network at a given instant. This network test is orchestrated by the master terminal 200 so as to limit the number of terminals that can send at a given instant.

On the master terminal 200, the following procedure is launched from the user interface of the master terminal 200.

The method according to the invention in succession processes each community of interest present in the network description database 202 and each service supported by each community of interest, by performing at least the operations described below.

If the number of terminals declared in the community of interest is greater than $N_{max}$, then several test groups are automatically formed as follows. A terminal N1 is chosen randomly from the terminals declared in the community of interest. The other terminals declared in the community of interests are divided up, randomly, into test groups comprising ($N_{max}$–1) terminals. If the number of these terminals is not divisible by ($N_{max}$–1), the last test group will contain a number of terminals less than ($N_{max}$–1). The terminal N1 is added to each duly created test group. This terminal N1 therefore forms part of all the test groups, for the community of interest and the service affected by the test. Thus, the intersection between all the test groups is not empty which makes it possible to ensure complete coverage of the procedure according to the network test invention.

If the number of terminals declared in the community of interest is less than or equal to $N_{max}$, the test group is identical to the community of interest.

A test of the network is performed for each test group by considering them one after the other, as follows.

A test request message with as recipients all the terminals of the test group, is sent by the network test module 211 of the master terminal 200. This request contains a sample corresponding to the service to be tested and a time delay value. This time delay value is automatically calculated according to the waveform, the number of terminals in the test group, and the size or the duration of the test sample.

The network test module 211 of the master terminal 200 then waits to receive all the test reports from each of the terminals of the test group. This wait is limited by the value of the time delay $T_{temp}$ added to the maximum duration $D_{max}$ for transmission of all the test reports.

The network test module 211 stores all the test reports received from the slave terminals. When all the communities of interest and the services have been tested, the network test module 211 sends the user of the master terminal 200 a summary of the network test results. This summary contains, for each community of interest and each service supported by it, the list of the terminals that appear in the test reports, that is to say, the terminals for which no acknowledgement has been received.

On each slave terminal 100, the following procedure is executed on receipt of a test request message.

The address of the terminal that has sent the test request message is stored, by the administration module, as being the address of the master terminal 200.

If the terminal is not also the master terminal 200, the ad hoc mobile communication system 103 of the slave terminal 100 exits from the radio silence mode.

The slave terminal 100 broadcasts to the community of interest the test sample received, previously transmitted by the master terminal 200.

It then waits for the time delay period received in the test message. During this wait, it performs the following operations.

It receives the test samples broadcast by each of the other terminals of the test group, and sends an acknowledgement message to each terminal sending these test samples.

It stores the acknowledgements received from the other terminals.

The wait may be shortened when the terminal has received an acknowledgement from all the other terminals receiving the test request, and it has itself sent an acknowledgement to all these terminals.

It sends the master terminal 200 a test report containing the list of the terminals receiving the test request for which no acknowledgement has been received.

If the terminal is not also the master terminal 200, the ad hoc mobile communication system 103 of the slave terminal 100 reactivates the radio silence mode.

Direct Communications between Terminals

The communication control module 112, 212 makes it possible to set up communications between terminals.

To allow these communications, the master terminal 200 begins by listing the communication requirements within the network by interrogating each slave terminal 100, then it authorizes the setting up of a selected set of communications. These operations are described below.

On each slave terminal 100, the database of communications to be set up 113 is updated on each new communication request or each time a previous request is deleted. These requests and these deletions are requested, for example, by the user of the slave terminal 100 via the user interface, or by an external system via a computer interface.

On the master terminal 200, the following procedure is executed periodically with a period defined by a configuration parameter.

The communication control module 212 of the master terminal 200 successively interrogates each slave terminal 100 as to its communication requirements and stores the responses in the database of communication requirements 213.

It determines, via the decision engine 214, which new communications can be authorized, and which existing communications must be interrupted.

For each new communication authorized, it notifies the authorization to the requesting terminal, specifying the unique identifier that was sent by the requesting terminal.

For each existing communication to be interrupted, it notifies the interruption to the terminal that had requested the communication, specifying the unique identifier that had been sent by the requesting terminal.

It updates its databases of the communication requirements 213 and of the established communications 215.

On each slave terminal 100, the following procedure is executed on receipt of a request for its communication requirements.

If the terminal is in radio silence mode, the ad hoc mobile communication system 103 of the slave terminal 100 deactivates the radio silence mode.

The slave terminal 100 responds to the request by sending the content of the database of communications to be established 113.

If the terminal was previously in radio silence mode, the ad hoc mobile communication system 103 of the terminal reactivates the radio silence mode.

On each slave terminal 100, the following procedure is executed on receipt of an authorization notification for a new communication.

The authorized new communication is deleted from the database of communications to be set up 113.

If the terminal is in radio silence mode, the ad hoc mobile communication system 103 of the terminal deactivates the radio silence mode.

The slave terminal 100 sets up the communication.

If this communication is bidirectional, all the recipient terminals, on receipt of the communication, ask their ad hoc mobile communication system 103 to deactivate the radio silence mode.

At the end of a bidirectional communication, each recipient terminal, on receipt of end of communication, requests its ad hoc mobile communication system reactivate the radio silence mode unless the terminal has other communications in progress, and unless the terminal is also the master terminal 200.

The communication control module 112 of the slave terminal 100 notifies the master terminal 200 of the end of communication by referring to the unique identifier corresponding to this communication.

If no other communication is in progress on the terminal and this terminal is not also the master terminal 200, the communication control module 112 requests the ad hoc mobile communication system 103 of the terminal reactivate the radio silence mode.

On each slave terminal 100, the following procedure is executed on receipt of a notification of interruption of an established communication.

The slave terminal 100 interrupts the communication.

If this communication was bidirectional, each recipient terminal, on receipt of end of communication, requests its ad hoc mobile communication system 103 to deactivate the radio silence mode unless the terminal has other communications in progress, and unless the terminal is also the master terminal 200.

If no other communication is in progress the terminal and this terminal is not also the master terminal 200, the ad hoc mobile communication system 103 of the terminal reactivates the radio silence mode.

Exiting from the "Close Proximity" Communication Mode

The administration module 114, 217 makes it possible to exit from the close proximity communication mode.

On the master terminal 200, the following procedure is launched by a command to exit from the close proximity communication mode.

The network test 211 and communication control 212 modules of the terminal are deactivated.

The databases of the communication requirements 213 and of current communications 215 are purged.

The administration module 217 of the master terminal 200 broadcasts to all the terminals of the network a notification of exit from the close proximity communication mode.

On each slave terminal 100, the following procedure is executed on receipt of a notification of exit from the close proximity communication mode.

The network test 111 and communication control 112 modules of the terminal are deactivated.

The database of communications to be set up 113 is purged.

The ad hoc mobile communication system 103 of the terminal deactivates the radio silence mode.

The invention claimed is:

1. A system for controlling communications within an ad hoc mobile network including a plurality of terminals, comprising:

each of said terminals including at least one radio antenna, an ad hoc mobile communication system suitable for sending and receiving data, a network description database which contains at least the address of all the terminals of the network and the list of the communities of interest which group all the terminals likely to have to communicate with one another, said terminals additionally including a slave orchestration system;

at least one of said terminals also including the master function, said master terminals also including a master orchestration system;

said slave orchestration system including at least one network test module, a module for controlling communications, a database of communications to be set up and an administration module;

said master orchestration system including at least one network test module, a module for controlling communications, a database of communication requirements, a decision engine, a database of current communications, a rule database for prioritizing communications and an administration module; and said master orchestration system being suitable for defining which communications between the slave terminals are authorized according to said prioritization rules and for notifying the slave orchestration systems of the slave terminals of their authorization to set up a communication or of the need to interrupt a communication previously set up, said prioritization rules being established according to at least one of the following criteria: criticality of the communication, maximum duration $D_{max}$ of the communication, maximum number of terminals that can send simultaneously, available bandwidth, wherein said network test module is suitable for executing, at a given instant, a test step comprising at least:

breaking down said community of interest into a number of test groups that is at least equal to one, each of said test groups comprising at most a number of terminals equal to the maximum number of terminals authorized to communicate simultaneously, the intersection between all the test groups being not empty;

sending from the master terminal to all the slave terminals of said test group a test request message containing a sample of the service to be tested and a time delay value $T_{temp}$;

sending from each slave terminal, upon receipt of said test request message, said test sample to all the terminals of the community of interest;

sending from each slave terminal of said test group, upon receipt of a test sample, an acknowledgement message to the slave terminal sending said test sample; and sending from each slave terminal of said test group to the master terminal, before the expiry of the time delay $T_{temp}$, a test resort containing the list of the terminals receiving the test sample for which no acknowledgement has been received.

2. A method for controlling communications within an ad hoc mobile network including a plurality of terminals having the slave function, said terminals also including a slave orchestration system, at least one of said terminals being a master terminal also including the master function, said master terminal also including a master orchestration system, said method comprising:
- a step for determining which communications between the slave terminals are authorized according to prioritization rules established according to at least one of the following criteria: criticality of the communication, maximum duration $D_{max}$ of the communication, maximum number of terminals that can send simultaneously, available bandwidth;
- a step for notifying the slave orchestration systems of the slave terminals of their authorization to set up a communication or of the need to interrupt a communication previously set up; and
- a step for testing, at a given instant, communications for all the communities of interest which group all the terminals likely to have to communicate with one another, said test step comprising at least:
  - breaking down said community of interest into a number of test groups that is at least equal to one, each of said test groups comprising at most a number of terminals equal to the maximum number of terminals authorized to communicate simultaneously, the intersection between all the test groups being not empty;
  - sending from the master terminal to all the slave terminals of said test group a test request message containing a sample of the service to be tested and a time delay value $T_{temp}$;
  - sending from each slave terminal, upon receipt of said test request message, said test sample to all the terminals of the community of interest;
  - sending from each slave terminal of said test group, upon receipt of a test sample, an acknowledgement message to the slave terminal sending said test sample; and
  - sending from each slave terminal of said test group to the master terminal, before the expiry of the time delay $T_{temp}$, a test report containing the list of the terminals receiving the test sample for which no acknowledgement has been received.

* * * * *